(12) United States Patent
Li et al.

(10) Patent No.: US 12,561,159 B2
(45) Date of Patent: Feb. 24, 2026

(54) VIRTUAL MACHINE MIGRATION METHOD AND RELATED DEVICE

(71) Applicant: HUAWEI TECHNOLOGIES CO., LTD., Shenzhen (CN)

(72) Inventors: Ming Li, Xi'an (CN); Leiqiang Zhang, Xi'an (CN); Si Shen, Beijing (CN); Jishi Liang, Hangzhou (CN); Tangzhen Li, Xi'an (CN); Wenguang Chen, Xi'an (CN)

(73) Assignee: Huawei Technologies Co., LTD., Shenzhen (CN)

( * ) Notice: Subject to any disclaimer, the term of this patent is extended or adjusted under 35 U.S.C. 154(b) by 497 days.

(21) Appl. No.: 17/945,864

(22) Filed: Sep. 15, 2022

(65) Prior Publication Data

US 2023/0012682 A1 Jan. 19, 2023

Related U.S. Application Data

(63) Continuation of application No. PCT/CN2021/074550, filed on Jan. 30, 2021.

(30) Foreign Application Priority Data

Mar. 16, 2020 (CN) .......................... 202010182191.3

(51) Int. Cl.
*G06F 9/455* (2018.01)
*G06F 9/48* (2006.01)
(Continued)

(52) U.S. Cl.
CPC ........ *G06F 9/45558* (2013.01); *G06F 9/4856* (2013.01); *G06F 11/1484* (2013.01)

(58) Field of Classification Search
CPC .............. G06F 9/45558; G06F 9/4856; G06F 11/1484; G06F 2009/45562; G06F 9/4411; G06F 2009/4557
See application file for complete search history.

(56) References Cited

U.S. PATENT DOCUMENTS 9,886,304 B1 2/2018 Vemuri
2015/0378771 A1* 12/2015 Tarasuk-Levin .... G06F 9/45558
718/1
(Continued)

FOREIGN PATENT DOCUMENTS

CN 104113574 A 10/2014
CN 105278874 A 1/2016
(Continued)

OTHER PUBLICATIONS

Anonymous, "Xen," Wikipedia, Nov. 14, 2011, Retrieved from URL: <https://en.wikipedia.org/w/index.php?title=Xenandoldid=450491213,> 10 pages.
(Continued)

*Primary Examiner* — Sisley N Kim
(74) *Attorney, Agent, or Firm* — Fish & Richardson P.C.

(57) ABSTRACT

Embodiments of this application disclose a virtual machine migration method. One example method includes: indicating, by a controller, a proxy virtual machine to mount a volume; replacing, by using the proxy virtual machine, a driver of an original platform in the volume with a driver of a target platform; and then, mounting a replaced volume to a target virtual machine.

20 Claims, 3 Drawing Sheets

(51) Int. Cl.
  G06F 11/14       (2006.01)
  G06F 11/1482     (2026.01)

(56)              References Cited

U.S. PATENT DOCUMENTS

| | | | | |
|---|---|---|---|---|
| 2015/0381589 | A1* | 12/2015 | Tarasuk-Levin .... | G06F 12/1408 |
| | | | | 713/193 |
| 2018/0203719 | A1 | 7/2018 | Zhang et al. | |
| 2019/0278662 | A1* | 9/2019 | Nagrale ................ | G06F 16/128 |
| 2019/0384679 | A1* | 12/2019 | Parambil ............. | G06F 11/1464 |
| 2020/0241907 | A1* | 7/2020 | Dornemann ........ | G06F 11/2097 |
| 2021/0049079 | A1* | 2/2021 | Kumar ................ | G06F 11/1484 |

FOREIGN PATENT DOCUMENTS

| | | |
|---|---|---|
| CN | 107688484 A | 2/2018 |
| CN | 109062670 A | 12/2018 |
| CN | 109522088 A | 3/2019 |
| CN | 109739617 A | 5/2019 |

OTHER PUBLICATIONS

Anonymous., "Kernel-based Virtual Machine," Wikipedia, Apr. 11, 2016, Retrieved from URL: <http://web.archive.org/web/20160411053301/https://en.wikipedia.org/wiki/Kernel-based_Virtual_Machine>, 6 pages.
Extended European Search Report in European Appln No. 21771084. 7, dated Jun. 30, 2023, 10 pages.
International Search Report and Written Opinion in International Appln. No. PCT/CN2021/074550, mailed on Apr. 29, 2021, 17 pages (with English translation).

* cited by examiner

VIRTUAL MACHINE MIGRATION METHOD AND RELATED DEVICE

CROSS-REFERENCE TO RELATED APPLICATIONS

This application is a continuation of International Application No. PCT/CN2021/074550, filed on Jan. 30, 2021, which claims priority to Chinese Patent Application No. 202010182191.3, filed on Mar. 16, 2020. The disclosures of the aforementioned applications are hereby incorporated by reference in their entireties.

TECHNICAL FIELD

Embodiments of this application relate to the field of computer network technologies, and in particular, to a virtual machine migration method and a related device.

BACKGROUND

A virtualization technology enables hardware resources to be virtualized, so that many different virtual machines can run on one physical host. The virtual machines run in a mutually isolated virtual hardware environment, and may have different operating systems, to provide services the same as those provided by a real physical host. As virtualization technologies become increasingly mature, many mature open-source virtualization technologies emerge, for example, open-source virtualization technologies such as a kernel-based virtual machine (KVM) and an open-source code virtual machine monitor (XEN).

However, because different virtualization technologies may be used on product bottom layers of different manufacturers, a new demand is generated, namely, virtual to virtual (V2V) migration. An existing V2V method is mainly used to obtain a root password of each virtual machine, and transmit disk data of the virtual machine (VM) to a target VM.

In the foregoing method, a root password of a user needs to be obtained, and a potential security problem exists. In addition, if a disk data volume is large, a disk data transmission time is long.

SUMMARY

Embodiments of this application provide a virtual machine migration method and a related device, which can improve virtual machine migration efficiency.

A first aspect of embodiments of this application provides a virtual machine migration method. The method includes: A controller indicates a proxy virtual machine to mount a volume, where the volume includes a first driver used to run the volume on an original platform; the controller indicates the proxy virtual machine to replace the first driver in the volume with a second driver, where the first driver is a driver for running the volume on the original platform, and the second driver is a driver for running the volume on a target platform; and the controller indicates the target platform to mount a replaced volume to a target virtual machine.

In this embodiment of this application, the controller is used to indicate the proxy virtual machine to mount the volume, a driver of the original platform in the volume is replaced with a driver of the target platform by using the proxy virtual machine, and then, the replaced volume is mounted on the target virtual machine, so that cross-platform migration of a virtual machine is implemented without volume transmission. A password of a user does not need to be obtained, so that security is improved. In addition, virtual machine migration can be implemented without transmitting data, so that virtual machine migration efficiency is improved.

Optionally, in a possible implementation of the first aspect, before the step in which the controller indicates the proxy virtual machine to replace the first driver in the volume with the second driver, the method further includes: The controller indicates the target platform to obtain management information of the original virtual machine.

Optionally, in a possible implementation of the first aspect, the foregoing method further includes: The controller indicates the target platform to create the target virtual machine based on the management information of the original virtual machine, where the original virtual machine is located on the original platform.

Optionally, in a possible implementation of the first aspect, the foregoing method further includes: The controller indicates the proxy virtual machine to unmount the replaced volume.

Optionally, in a possible implementation of the first aspect, the step in which the controller indicates the proxy virtual machine to mount the volume includes: The controller indicates the proxy virtual machine to mount a plurality of volumes, where the plurality of volumes belong to a plurality of virtual machines on the original platform. The step in which the controller indicates the proxy virtual machine to replace the first driver in the volume with the second driver includes: The controller indicates the proxy virtual machine to replace a first driver in each of the plurality of volumes with a second driver. The step in which the controller indicates the target platform to mount the replaced volume to the target virtual machine includes: The controller indicates the target platform to respectively mount a plurality of replaced volumes to a plurality of target virtual machines.

In this possible implementation, migration of a batch of virtual machines is implemented by mounting a plurality of volumes, replacing drivers of the plurality of volumes, and creating a plurality of target virtual machines.

Optionally, in a possible implementation of the first aspect, the foregoing method further includes: The controller indicates the target platform to take a snapshot of the volume; and the controller indicates the target platform to roll back the snapshot.

In this possible implementation, by taking a snapshot, a volume version that includes a first driver may be rolled back after switching fails or a customer regrets, thereby avoiding data loss in the volume due to a switching failure.

Optionally, in a possible implementation of the first aspect, the foregoing method further includes: The controller indicates the original platform to set an operation permission for the volume.

In this possible implementation, the operation permission is set to prevent a risk of switching failure caused by misoperation by another person.

Optionally, in a possible implementation of the first aspect, in the foregoing steps, the original platform is an XEN platform, and the target platform is a KVM platform.

This possible implementation improves implementability of the solution.

A second aspect of this application provides a controller, configured to perform the method in the first aspect or any possible implementation of the first aspect. Specifically, the controller includes a module or a unit configured to perform the method in the first aspect or any possible implementation of the first aspect.

A third aspect of this application provides a controller. The controller performs the method in the first aspect or any possible implementation of the first aspect.

A fourth aspect of this application provides a computer storage medium. The computer storage medium stores instructions. When the instructions are executed on a computer, the computer is enabled to perform the method according to any one of the first aspect or the possible implementations of the first aspect.

A fifth aspect of this application provides a computer program product. When the computer program product is executed on a computer, the computer is enabled to perform the method according to any one of the first aspect or the possible implementations of the first aspect.

DESCRIPTION OF EMBODIMENTS

Embodiments of this application provide a virtual machine migration method and a related device, which can improve virtual machine migration efficiency.

With reference to the accompanying drawings, the following describes in detail implementation principles, specific implementations, and corresponding achievable beneficial effects of the technical solutions of this application.

Figure 1:
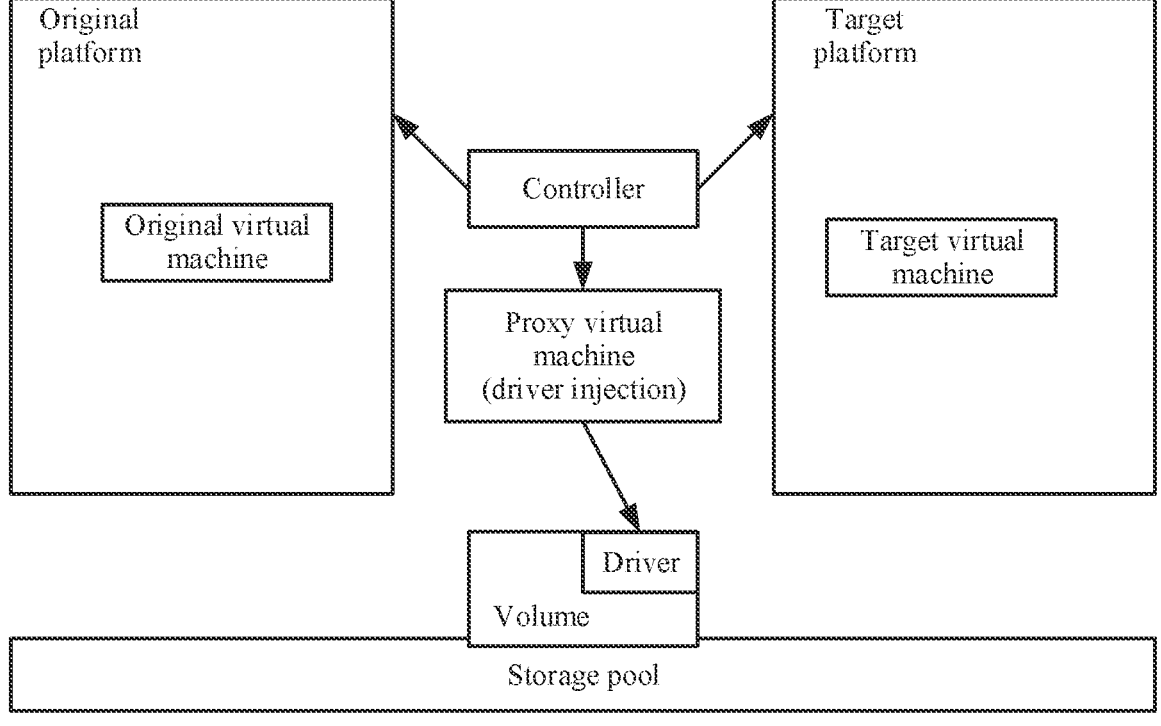
FIG. 1 is a schematic diagram of a network framework for virtual machine migration according to an embodiment of this application.

FIG. 1 is a schematic diagram of a network framework for virtual machine migration according to an embodiment of this application. Refer to FIG. 1. The network framework in this embodiment of this application includes an original platform, an original virtual machine, a target platform, a target virtual machine, a controller, and a proxy virtual machine.

The original platform is a platform where an original virtual machine of a customer is located. A volume to be migrated on the original platform is in a storage pool.

The target platform is a target platform which may be a platform newly created by a customer or an existing platform.

A main function of the controller is to connect the original platform and the target platform, arrange a switching service, and control driver injection. Switching can be performed individually or in batches. Services are provided externally for a service person to operate. The Controller in this embodiment of this application may be a Java/Spring-based server program. The service person may perform the following operations by connecting to a service page of the Controller: selecting an original platform that needs to be switched, selecting a target platform that needs to be switched to, selecting a virtual machine or template that needs to be switched, selecting virtual machines that need to be switched in a same batch, selecting virtual machines for switching exercises, selecting virtual machines on which exercises are finished and determining whether switching can be performed based on a result, selecting virtual machines to be switched, selecting virtual machines that are successfully switched, and selecting virtual machines to be rolled back to an initial state. This is not specifically limited herein.

A proxy virtual machine Agent may be a service virtual machine that is deployed based on C++ and is dedicated for driver injection. A main function of the Agent is to receive instructions from the Controller to replace a driver of an original platform in a data volume with a driver of a target platform.

The Agent and the controller may be carried on the original platform, or may be carried on the target platform. The original virtual machine and the volume are in the original platform in an initial state. If the switching succeeds, the original virtual machine is deleted from the original platform, and a volume entity still exists in a memory. If the switching fails, the original virtual machine and the volume are still restored to the initial state. The original platform may be upgraded to support bidirectional mounting of uniform storage.

The target platform can also access the storage pool where the volume is located. If the switching succeeds, the target platform identifies and manages the volume and creates a target virtual machine. If the switching fails, the volume is returned to the initial state. After the switching succeeds, the original platform no longer manages the storage pool.

In this embodiment of this application, switching selection and switching task delivering are performed in the Controller. A system automatically identifies and manages the volume to the target platform, and creates a target virtual machine for configuration. Compared with the conventional technology, data is not copied in this process, and therefore, switching efficiency is greatly improved.

In this embodiment of this application, the original platform may be an XEN, or may be VMWare. The target platform may be a KVM. In actual application, as long as the target platform can access stored data of the original platform, and an interface may be invoked (the original platform and the target platform are adapted to bidirectional mounting and other related interfaces), the original platform and the target platform may be platforms of other forms. This is not specifically limited herein.

The following describes a virtual machine migration method in an embodiment of this application with reference to the network framework in FIG. 1.

Figure 2:
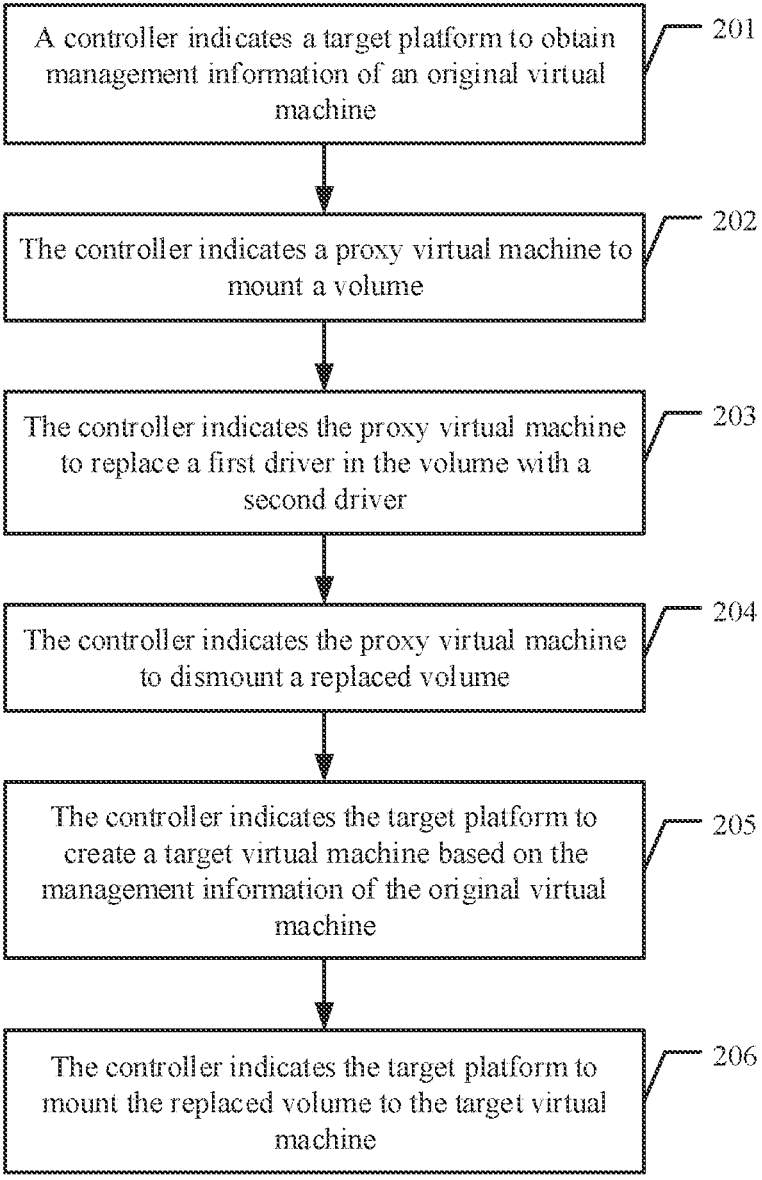
FIG. 2 is a schematic flowchart of a virtual machine migration method according to an embodiment of this application.

Refer to FIG. 2. An embodiment of the virtual machine migration method in this embodiment of this application includes:

In this embodiment of this application, migration of a batch of virtual machines may be further performed. The following describes the virtual machine migration method by using one virtual machine as an example (a migration process of a batch is similar to a migration process of one).

201: A controller indicates a target platform to obtain management information of an original virtual machine.

The controller indicates the target platform to invoke a pre-developed interface of the target platform. The interface is an interface that is provided by the platform and is configured to operate resources such as a virtual machine or a volume of the platform. For example, the interface is used to create a virtual machine or manage a volume.

Optionally, before the controller indicates the target platform to obtain the management information of the original virtual machine, the controller indicates the original platform to disable the original virtual machine on the original platform, that is, in a virtual machine switching process, no incremental update occurs on data, to avoid incomplete data after virtual machine switching. After the original virtual machine is disabled, a first operation permission may be further set for a volume in the original virtual machine and the original virtual machine, to avoid misoperation by another person.

Optionally, before the controller indicates the target platform to obtain the management information of the original virtual machine, the original virtual machine is not disabled, thereby shortening the time for interrupting a customer service.

202: The controller indicates a proxy virtual machine to mount a volume.

Optionally, the controller indicates the target platform to take a snapshot of the volume, to prevent the volume from being lost after switching fails.

Before the proxy virtual machine mounts the volume, the controller may indicate the original platform to stop using the original virtual machine on the original platform.

In this embodiment of this application, that the proxy virtual machine is on the target platform is only used as an example for description. It may be understood that the proxy virtual machine may alternatively be on the original platform. This is not specifically limited herein.

The step in which the controller indicates the proxy virtual machine to mount the volume may be that the controller indicates the target platform to mount the volume on the proxy virtual machine through an interface.

203: The controller indicates the proxy virtual machine to replace a first driver in the volume with a second driver.

After the volume is mounted on the proxy virtual machine, the controller indicates the proxy virtual machine to replace the first driver in the volume with the second driver. The proxy virtual machine selects a corresponding second driver based on a driver list of the target platform. The first driver is a driver for running the volume on the original platform, and the second driver is a driver for running the volume on the target platform.

204: The controller indicates the proxy virtual machine to unmount a replaced volume.

After the first driver is replaced with the second driver, the controller indicates the proxy virtual machine to unmount the volume, so that the volume becomes free.

205: The controller indicates the target platform to create a target virtual machine based on the management information of the original virtual machine.

The control platform indicates the target platform to receive the management information of the volume in the original virtual machine through the pre-developed interface, and establish the management information of the volume on the target platform. The target virtual machine is created on the target platform by using the management information.

206: The controller indicates the target platform to mount the replaced volume to the target virtual machine.

The controller indicates the target platform to mount the replaced volume to the target virtual machine that includes the management information of the volume.

After the target platform mounts the replaced volume to the target virtual machine, the target virtual machine may be started. The controller may also indicate the target platform to set a second operation permission for the target virtual machine.

Optionally, if the first operation permission is previously set for the volume in the original virtual machine and the original virtual machine, the first operation permission of the volume in the original virtual machine and the original virtual machine may be cancelled after the replaced volume is mounted to the target virtual machine.

Optionally, if the target platform takes a snapshot of the volume previously, after the target virtual machine is started, whether the service usage of the target virtual machine is normal may be checked, and if the service usage of the target virtual machine is normal, the snapshot may be deleted. If the service usage of the target virtual machine is not normal or migration is regretted, the snapshot can be rolled back (that is, a version of the first driver is in the volume). If the target platform sets the second operation permission for the target virtual machine previously, after the snapshot is deleted, the second operation permission of the target virtual machine may be cancelled.

After the target virtual machine is started and can normally provide a service, the controller indicates the original virtual machine to cancel the original virtual machine (delete management data in the virtual machine and keep the volume).

In this embodiment of this application, a time for disabling the original virtual machine may be a start of a switching method, or may be a time before driver replacing. If the original virtual machine is started to be disabled, no incremental update occurs on data, to avoid incomplete data after the virtual machine is switched. If the original virtual machine is disabled when driver replacement is to be performed, duration in which a customer service is interrupted can be shortened.

In this embodiment of this application, bidirectional mounting is performed on a volume in advance, cross-engine switching is arranged by using a controller, and a second driver suitable for a target platform is injected into the volume by using an agent, so that cross-engine migration without data migration is automatically implemented, thereby reducing migration duration greatly. In addition, entering a customer system is avoided, and a user password does not need to be collected. There is no continuous performance impact on an original service of a user except a temporary suspension at a minute level. Properly deploying Controller and Agent loads can greatly improve a concurrent migration capability, and is suitable for migration of a batch of virtual machines.

The virtual machine migration method in this embodiment of this application may be applied to an X86 architecture, may be applied to an ARM architecture, or the like. This is not specifically limited herein. As long as a target platform supports an architecture, can invoke an interface, and can implement and identify a volume of an original platform, the virtual machine migration efficiency can be improved.

Figures 3, 4:
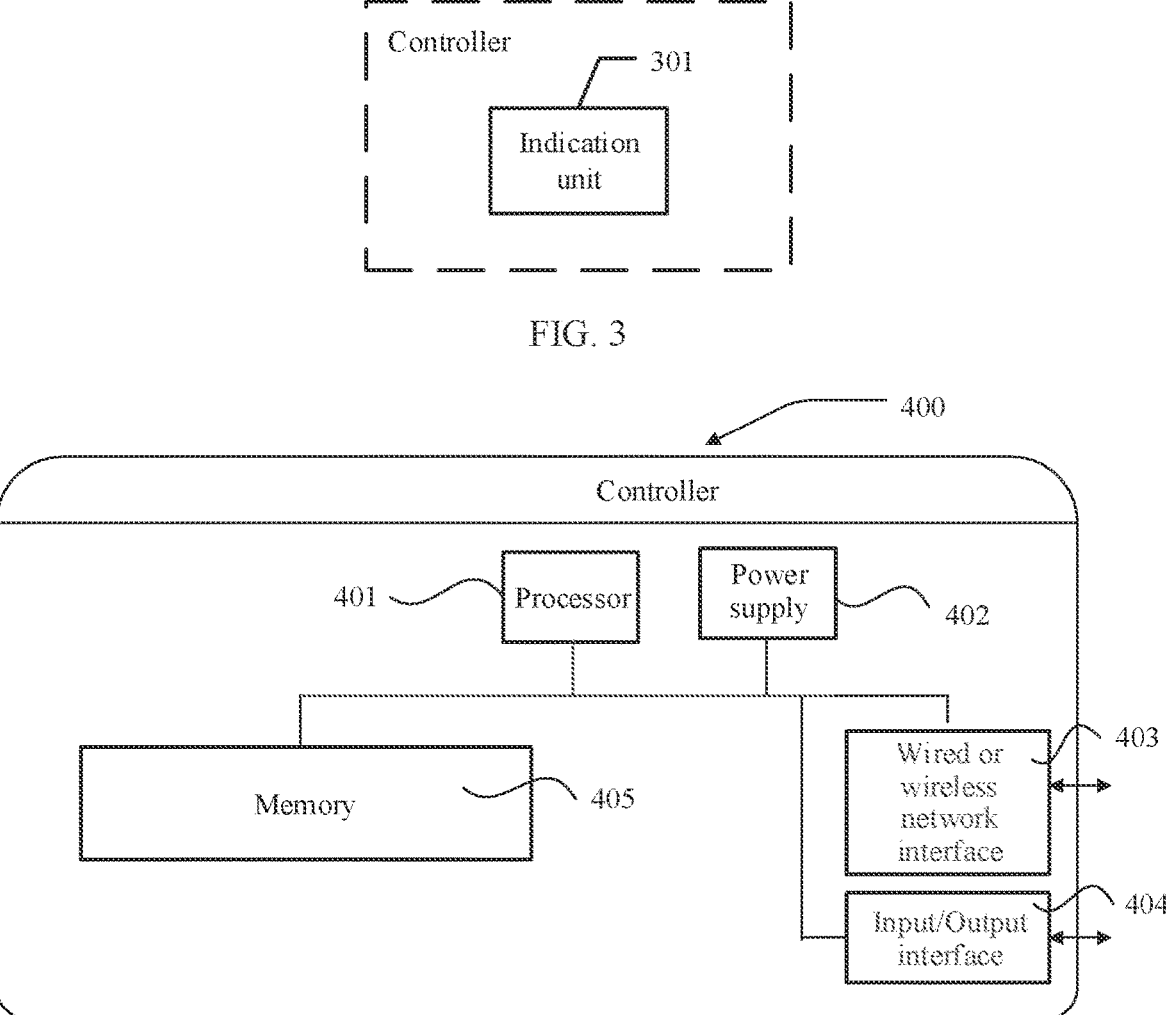
FIG. 3 is a schematic diagram of a structure of a controller according to an embodiment of this application.
FIG. 4 is another schematic diagram of a structure of a controller according to an embodiment of this application.

The foregoing describes the virtual machine migration method in this embodiment of this application. The following describes the controller in this embodiment of this application. Refer to FIG. 3. An embodiment of the controller in this embodiment of this application includes:

an indication unit 301, configured to indicate a proxy virtual machine to mount a volume, where the volume includes a first driver used to run the volume on an original platform.

The indication unit 301 is further configured to indicate the proxy virtual machine to replace the first driver in the volume with a second driver, where the first driver is a driver for running the volume on the original platform, and the second driver is a driver for running the volume on a target platform.

The indication unit 301 is further configured to indicate the target platform to mount a replaced volume to a target virtual machine.

The indication unit 301 is further configured to indicate the target platform to obtain management information of an original virtual machine.

The indication unit 301 is further configured to indicate the target platform to create the target virtual machine based on the management information of the original virtual machine, where the original virtual machine is located on the original platform.

The indication unit 301 is further configured to indicate the proxy virtual machine to unmount the replaced volume.

The indication unit 301 is specifically configured to indicate the proxy virtual machine to mount a plurality of volumes, where the plurality of volumes belong to a plurality of virtual machines on the original platform.

The indication unit 301 is specifically configured to indicate the proxy virtual machine to replace a first driver in each of the plurality of volumes with a second driver.

The indication unit 301 is specifically configured to indicate the target platform to respectively mount a plurality of replaced volumes to a plurality of target virtual machines.

The indication unit 301 is further configured to indicate the target platform to take a snapshot of the volume.

The indication unit 301 is further configured to indicate the target platform to roll back the snapshot.

The indication unit 301 is further configured to indicate the original platform to set an operation permission for the volume.

In this embodiment of this application, the indication unit 301 indicates the proxy virtual machine to mount the volume, a driver of the original platform in the volume is replaced with a driver of the target platform by using the proxy virtual machine, and then, the replaced volume is mounted on the target virtual machine, so that cross-platform migration of a virtual machine is implemented without volume transmission.

FIG. 4 is a schematic diagram of a structure of a controller according to an embodiment of this application. The controller 400 may include one or more processors 401 and a memory 405. The memory 405 stores one or more application programs or data.

The memory 405 may be a volatile memory or a nonvolatile memory. A program stored in the memory 405 may include one or more modules, and each module may include a series of instruction operations in the controller 400. Further, the processor 401 may be configured to communicate with the memory 405, and execute a series of instruction operations in the memory 405 on the controller 400.

The controller 400 may further include one or more power supplies 402, one or more wired or wireless network interfaces 403, one or more input/output interfaces 404, and/or one or more operating systems, such as Windows Server™, Mac OS X™, Unix™, Linux™, and FreeBSD™.

The processor 401 may perform the operations performed by the controller in the embodiment shown in FIG. 2. Details are not described herein again.

In the several embodiments provided in this application, it should be understood that the disclosed system, apparatus, and method may be implemented in another manner. For example, the described apparatus embodiments are merely examples. For example, division into units is merely logical function division and may be other division during actual implementation. For example, a plurality of units or components may be combined or integrated into another system, or some features may be ignored or not performed.

In addition, functional units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A virtual machine migration method, comprising:
   indicating, by a controller, a proxy virtual machine to mount a volume, wherein the volume comprises a first driver used to run the volume on an original platform;
   indicating, by the controller, the proxy virtual machine to replace the first driver in the volume with a second driver by injecting the second driver into the volume, wherein the first driver is a driver for running the volume on the original platform, and the second driver is a driver for running the volume on a target platform;
   indicating, by the controller, the target platform to mount a replaced volume to a target virtual machine; and
   cancelling a first operation permission for the volume on the original platform in response to the replaced volume having been mounted to the target virtual machine.

2. The method according to claim 1, wherein the method further comprises:
   indicating, by the controller, the target platform to obtain management information of an original virtual machine.

3. The method according to claim 2, wherein the method further comprises:
   indicating, by the controller, the target platform to create the target virtual machine based on the management information of the original virtual machine, wherein the original virtual machine is located on the original platform.

4. The method according to claim 1, wherein the method further comprises:
   indicating, by the controller, the proxy virtual machine to unmount the replaced volume.

5. The method according to claim 1, wherein the indicating, by a controller, a proxy virtual machine to mount a volume comprises:
   indicating, by the controller, the proxy virtual machine to mount a plurality of volumes, wherein the plurality of volumes belong to a plurality of virtual machines on the original platform;
   the indicating, by the controller, the proxy virtual machine to replace the first driver in the volume with a second driver comprises:

indicating, by the controller, the proxy virtual machine to replace a first driver in each of the plurality of volumes with a second driver; and the indicating, by the controller, the target platform to mount a replaced volume to a target virtual machine comprises:

indicating, by the controller, the target platform to respectively mount a plurality of replaced volumes to a plurality of target virtual machines.

6. The method according to claim 1, wherein the method further comprises:

indicating, by the controller, the target platform to take a snapshot of the volume; and indicating, by the controller, the target platform to roll back the snapshot.

7. The method according to claim 1, wherein the method further comprises:

indicating, by the controller, the original platform to set an operation permission for the volume.

8. The method according to claim 1, wherein the original platform is an open-source code virtual machine monitor (XEN) platform, and the target platform is a kernel-based virtual machine (KVM) platform.

9. A controller, comprising:

at least one processor; and one or more memories coupled to the at least one processor and storing programming instructions for execution by the at least one processor to cause the controller to:

indicate a proxy virtual machine to mount a volume, wherein the volume comprises a first driver used to run the volume on an original platform;

indicate the proxy virtual machine to replace the first driver in the volume with a second driver by injecting the second driver into the volume, wherein the first driver is a driver for running the volume on the original platform, and the second driver is a driver for running the volume on a target platform;

indicate the target platform to mount a replaced volume to a target virtual machine; and cancel a first operation permission for the volume on the original platform in response to the replaced volume having been mounted to the target virtual machine.

10. The controller according to claim 9, wherein the programming instructions, when executed by the at least one processor, cause the controller to:

indicate the target platform to obtain management information of an original virtual machine.

11. The controller according to claim 10, wherein the programming instructions, when executed by the at least one processor, cause the controller to:

indicate the target platform to create the target virtual machine based on the management information of the original virtual machine, wherein the original virtual machine is located on the original platform.

12. The controller according to claim 9, wherein the programming instructions, when executed by the at least one processor, cause the controller to:

indicate the proxy virtual machine to unmount the replaced volume.

13. The controller according to claim 9, wherein the programming instructions, when executed by the at least one processor, cause the controller to:

indicate the proxy virtual machine to mount a plurality of volumes, wherein the plurality of volumes belong to a plurality of virtual machines on the original platform;

indicate the proxy virtual machine to replace a first driver in each of the plurality of volumes with a second driver; and indicate the target platform to respectively mount a plurality of replaced volumes to a plurality of target virtual machines.

14. The controller according to claim 9, wherein the programming instructions, when executed by the at least one processor, cause the controller to:

indicate the target platform to take a snapshot of the volume; and indicate the target platform to roll back the snapshot.

15. The controller according to claim 9, wherein the programming instructions, when executed by the at least one processor, cause the controller to:

indicate the original platform to set an operation permission for the volume.

16. The controller according to claim 9, wherein the original platform is open-source code virtual machine monitor (XEN) platform, and the target platform is a kernel-based virtual machine (KVM) platform.

17. A non-transitory computer storage medium, wherein the computer storage medium stores instructions, and when the instructions are run on a computer, the computer is enabled to:

indicate a proxy virtual machine to mount a volume, wherein the volume comprises a first driver used to run the volume on an original platform;

indicate the proxy virtual machine to replace the first driver in the volume with a second driver by injecting the second driver into the volume, wherein the first driver is a driver for running the volume on the original platform, and the second driver is a driver for running the volume on a target platform;

indicate the target platform to mount a replaced volume to a target virtual machine; and cancel a first operation permission for the volume on the original platform in response to the replaced volume having been mounted to the target virtual machine.

18. The computer storage medium according to claim 17, wherein when the instructions are run on a computer, the computer is further enabled to:

indicate the target platform to obtain management information of an original virtual machine; and indicate the target platform to create the target virtual machine based on the management information of the original virtual machine, wherein the original virtual machine is located on the original platform.

19. The computer storage medium according to claim 17, wherein when the instructions are run on a computer, the computer is further enabled to:

indicate the proxy virtual machine to unmount the replaced volume.

20. The computer storage medium according to claim 17, wherein when the instructions are run on a computer, the computer is further enabled to:

indicate the proxy virtual machine to mount a plurality of volumes, wherein the plurality of volumes belong to a plurality of virtual machines on the original platform;

indicate the proxy virtual machine to replace a first driver in each of the plurality of volumes with a second driver; and indicate the target platform to respectively mount a plurality of replaced volumes to a plurality of target virtual machines.

* * * * *